No. 807,624. PATENTED DEC. 19, 1905.
O. LAUBER & F. STOCK.
GUN WITH INDEPENDENT SIGHTING LINE.
APPLICATION FILED AUG. 30, 1904.

No. 807,624. PATENTED DEC. 19, 1905.
O. LAUBER & F. STOCK.
GUN WITH INDEPENDENT SIGHTING LINE.
APPLICATION FILED AUG. 30, 1904.

Witnesses
M. B. Hayes.
E. A. Parabaker.

Inventors
Otto Lauber and
Fried Stock
By Knight Bros
Attys.

No. 807,624. PATENTED DEC. 19, 1905.
O. LAUBER & F. STOCK.
GUN WITH INDEPENDENT SIGHTING LINE.
APPLICATION FILED AUG. 30, 1904.

No. 807,624. PATENTED DEC. 19, 1905.
O. LAUBER & F. STOCK.
GUN WITH INDEPENDENT SIGHTING LINE.
APPLICATION FILED AUG. 30, 1904.

UNITED STATES PATENT OFFICE.

OTTO LAUBER AND FRIEDRICH STOCK, OF ESSEN-ON-THE-RUHR, GERMANY, ASSIGNORS TO FRIED. KRUPP, AKTIENGESELLSCHAFT, OF ESSEN-ON-THE-RUHR, GERMANY.

GUN WITH INDEPENDENT SIGHTING-LINE.

No. 807,624.   Specification of Letters Patent.   Patented Dec. 19, 1905.

Application filed August 30, 1904. Serial No. 222,746.

*To all whom it may concern:*

Be it known that we, OTTO LAUBER and FRIEDRICH STOCK, residing at Essen-on-the-Ruhr, Germany, subjects of the German Emperor, have invented a certain new and useful Gun with Independent Sighting-Line, of which the following is a specification.

The present invention relates to guns with independent sighting-lines; and the object of the invention is to provide, in connection with the sight-post, a device which is as compact as possible, easily accessible, and constructed to permit adjustment of the elevation of the gun-barrel either with the sight-post or relatively thereto. This object according to the present invention is obtained by arranging coaxially the screw members of two mechanisms employed for fixing the elevation and by causing one of the said mechanisms to connect with the sight-post and the other mechanism to connect with the gun-barrel.

In the accompanying drawings the invention is shown, by way of illustration, as applied to a recoil-gun having a cradle capable of horizontal training.

In said drawings, Fig. 1ª is a side elevation corresponding to Fig. 1 with some parts omitted or broken away. Fig. 7 is a side elevation corresponding to Fig. 1 of a second embodiment of the invention.

Referring to the embodiment shown in Figs. 1 to 6, inclusive, A is the part to be elevated or the cradle of the gun, on which the gun-barrel B, also to be elevated, is slidably mounted. The cradle A is in the customary manner connected with the saddle C by means of a vertical trunnion $a'$. The cradle is further connected with a training mechanism D for the horizontal movement. Through the medium of the hand-wheel $d'$ of the training mechanism the cradle and the gun-barrel mounted thereon can be swung horizontally around the axis of the vertical trunnion $a'$. The saddle C is in the customary manner journaled in the mount J by means of the horizontal trunnions $c'$ and can, with the cradle A and the gun-barrel B, be swung about the axis of the horizontal trunnions $c'$. The sight-post E, carrying the sight $e'$, is curved in an arc—that is, concentric with the horizontal trunnions $c'$—when the training mechanism D is in its zero position. The sight-post is adapted to slide in a guide-piece $a^2$, secured to the cradle A and of a curvature corresponding to that of the sight-post. The rear face of the sight-post E is provided with a distance-scale $e^3$. The gun is provided with two screw mechanisms for fixing the elevation, one of which consists of the two telescoping screws H and L, a sleeve N, bevel-gears $n^3 p^2$, a shaft P, a second pair of bevel-gears $p^4 q^4$, a shaft Q, and a hand-wheel $q$, and the purpose of this mechanism is to adjust the elevation of the gun-barrel with relation to the sight-post. The second screw mechanism consists of a screw M, a nut S, shaped exteriorly as a bevel-gear, a bevel-gear $r^3$, a shaft R, a second pair of bevel-gears $r^4 t^4$, a shaft T, and a hand-wheel $t$, and the purpose of this mechanism is to adjust the elevation of the gun-barrel with the sight-post. The screws of the two mechanisms are arranged coaxially to each other, the screw L of one mechanism engaging the threads of the screw M of the other mechanism. The elevating-mechanism carrier K provides for the connection of the elevating mechanism to the mount J. The shape of the carrier K is clearly shown in Figs. 3 and 5. By means of a pair of hollow trunnions $k$ the carrier K is rotatably supported in the mount J in such a manner that the carrier can partake in the swinging movements of the elevating mechanisms when the elevation is adjusted. The first mentioned of the two elevating mechanisms engages the gun-barrel by means of a head $h$ of the screw H, which by means of a joint bolt $c^2$, Fig. 1ª, is linked to the saddle C. The position of the bolt $c^2$ coincides with the curvature of the sight-post, Fig. 1ª. The screw H is left-handed and is prevented from rotation around its axis by the bolt $c^2$. The screw L is a hollow screw, and its interior is provided with threads for the screw H. The exterior of the screw L is provided with right-handed threads and is of such a length that the lower end of the screw extends beyond the screw M. In the lower part of the outer wall of the screw L are cut longitudinal grooves $l$, into which feathers $n'$ of the sleeve N project. The sleeve N is arranged rotatably but non-slidably in a bore of the elevating-mechanism carrier K, said bore being coaxial to the screw. The feathers $n'$, which project into the groove $l$, force the screw L to partake of the rotation of the sleeve N, while they permit a longitudinal movement of the screw L relative to the sleeve N. On the sleeve N a bevel-gear $n^2$ is rigidly secured, which meshes with the bevel-gear $p^2$ on the shaft P. The shaft P is journaled in the right-hand hollow trunnion $k$, Fig. 3, of the carrier K and is capable of being rotated by means of the hand-wheel $q$ and the above-mentioned gear Q $q^4$ $p^4$. The second of the two elevating mechanisms is by means of the screws H and L indirectly connected with the gun-barrel, and by means of an arm F and a slide G it is directly connected with the sight-post E. The screw M of this second elevating mechanism is provided on its exterior with right-handed screw-threads. In the outer wall of the screw are longitudinal grooves $m'$, into which project feathers $k'$, that are secured in the bore of the carrier K coaxial to the screw M. The feathers $k'$ prevent the rotation of the screw M around its axis, while they permit a longitudinal movement of the screw relative to the carrier K. The screw M is surrounded by the bevel-gear nut S, that is arranged in the bore of the carrier K in such a manner that it can rotate, but not move longitudinally. The bevel-gear $r^2$, which is secured to the shaft R, meshes with the toothed crown of the nut S. The shaft R is journaled in the left-hand hollow trunnion $k$, Fig. 3, of the carrier K and is rotated by means of the hand-wheel $t$ and the gear T $t^4$ $r^4$. To the disk-shaped head $m^2$ of the screw M an ⌐-shaped arm F is secured. The plate $f'$ of the said arm is provided with an undercut groove, Figs. 1 and 4, so as to form a race that is curved in an arc which in the zero position of the gun is concentric with the vertical trunnion $a'$. A slide G is mounted to slide on said race, and the base $g'$ of the slide is inserted into the groove of the race. The slide G is provided with two projections $g^2$, forming a fork that embraces the lower end of the sight-post. The projections are provided with slots, Fig. 1, so as to form a second race $g^4$, in which a bolt $e^2$, inserted through the lower end of the sight-post, can slide. The race $g^4$ is curved in an arc that is concentric with the trunnions $k$ of the carrier K when the horizontal training mechanism is in its zero position.

In Figs. 1 to 6 the relative positions of the different parts correspond to an angle of elevation of 0° and to an angle of site of 0°. When the hand-wheel $q$ is turned clockwise, the sleeve N is rotated through the medium of the shafts Q and P and the several bevel-gears. By means of the feathers $n'$ the sleeve N carries along with it the screw L and screws it downwardly into the screw M, the latter being prevented from rotation by the feathers $k'$, and the screw L slides with the walls of its grooves $l$ along the feathers $n'$. At the same time the screw H is in the customary manner screwed into the screw L. As a result of the said operations the gun-barrel B and cradle A are swung around the horizontal trunnions $c'$ in the direction of elevation of the gun. At the same time the elevating-mechanism carrier K makes a slight swinging movement around its trunnions $k$ $k$. The movements above described have no effect on the relative position of the screw M and the carrier K. The screw M, with the arm F, has partaken of the swinging movement of the carrier K; but the said movement has no effect on the relative position of the sight-post and the fixed parts of the gun, as the bolt $e^2$ of the sight-post can slide in the race $g^4$. While the sight-post E has been stationary, the guide-piece $a^2$, that is rigidly connected to the cradle A, has, however, moved along the sight-post, and thus the upper edge of the guide-piece $a^2$ will indicate on the scale $e^3$ the amount of elevation or the range corresponding thereto, Fig. 2. When the horizontal training mechanism D is used—that is to say, when the cradle with the gun-barrel is swung on the vertical trunnion $a'$, Fig. 1—the slide G, carrying the sight-post, slides on the race $f'$. The connection between the sight-post and the second elevating mechanism is therefore not influenced by the horizontal training of the gun-barrel. If the hand-wheel $q$ is turned counter-clockwise, the direction of movement of the different parts is reversed. The sight-post retains its position while the gun-barrel is lowered. When the hand-wheel $t$ is turned clockwise, the nut S is rotated by means of the shaft T and R and the several bevel-gears, and the screw M, which is prevented from rotation around its axis by the feathers $k'$, is screwed downwardly into the nut S. The said movement of the screw M is simultaneously transmitted to the cradle or the gun-barrel and the sight-post, and the gun-barrel is elevated. The downward movement of the screw M is transmitted to the gun-barrel through the medium of the screw L, prevented from rotating by autoblockage, and the screw H. The downward movement of the screw M is transmitted to the sight-post E through the medium of the arm F and the slide G. The movement of the sight-post with relation to the fixed parts of the gun takes place in an arc that is coincident with the arc of movement of the bolt $c^2$, that connects the screw H with the saddle C or the cradle and the gun-barrel. The movement of the screw M, that is transmitted uniformly to the sight-post and the gun-barrel, therefore causes the same angular movement of the two parts, or, in other words, the relative position of elevation of the gun-barrel and the sight-post remains unaltered during the vertical adjustment of the two parts effected by operating the hand-wheel $t$. As, however, the bolt $e^2$ of the sight-post partakes in the movement of the post, while the arm F and the slide G are obliged to follow the swinging movement of the elevating mechanism around the trunnions $k$, the bolt $e^2$ moves in the race $g^4$. If the hand-wheel $t$ is turned counter-clockwise, the direction of movement of the different parts will be inverted.

Figure 1:
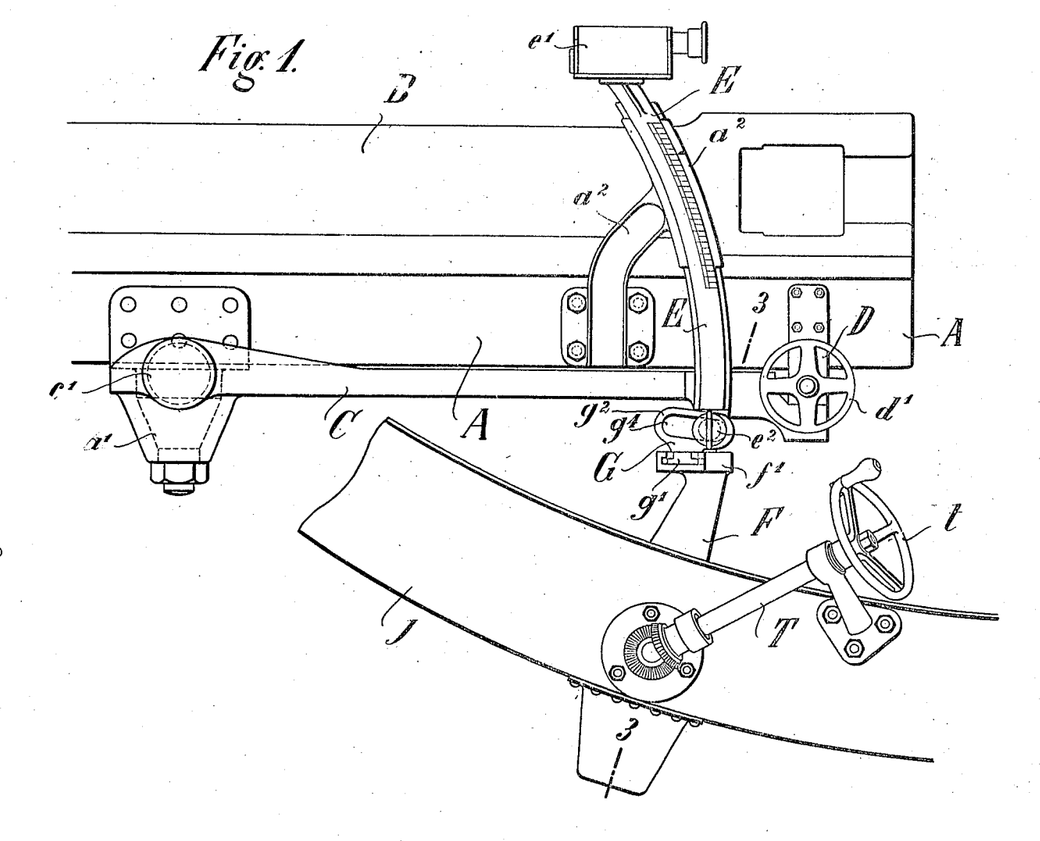
Figure 1 is a side elevation of one embodiment of the invention, only the parts having relation to the invention being illustrated.
Figure 1A:
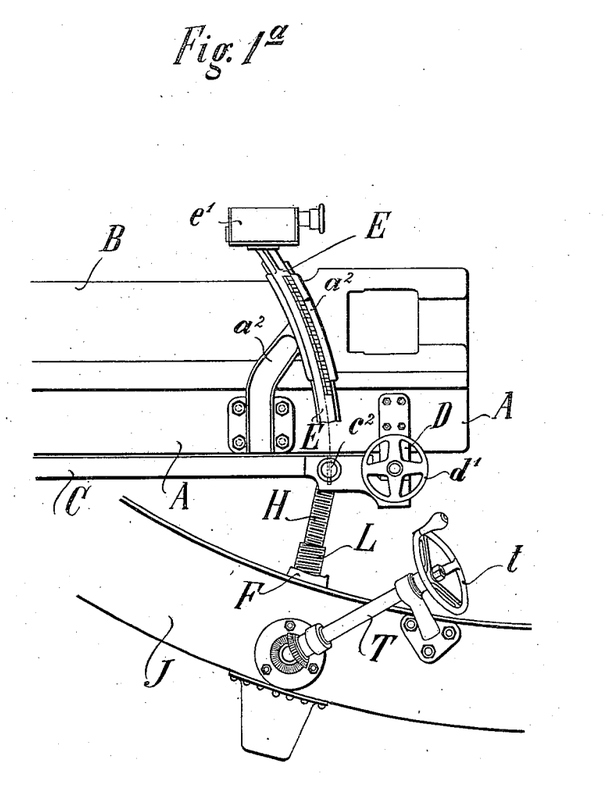
Figure 2:
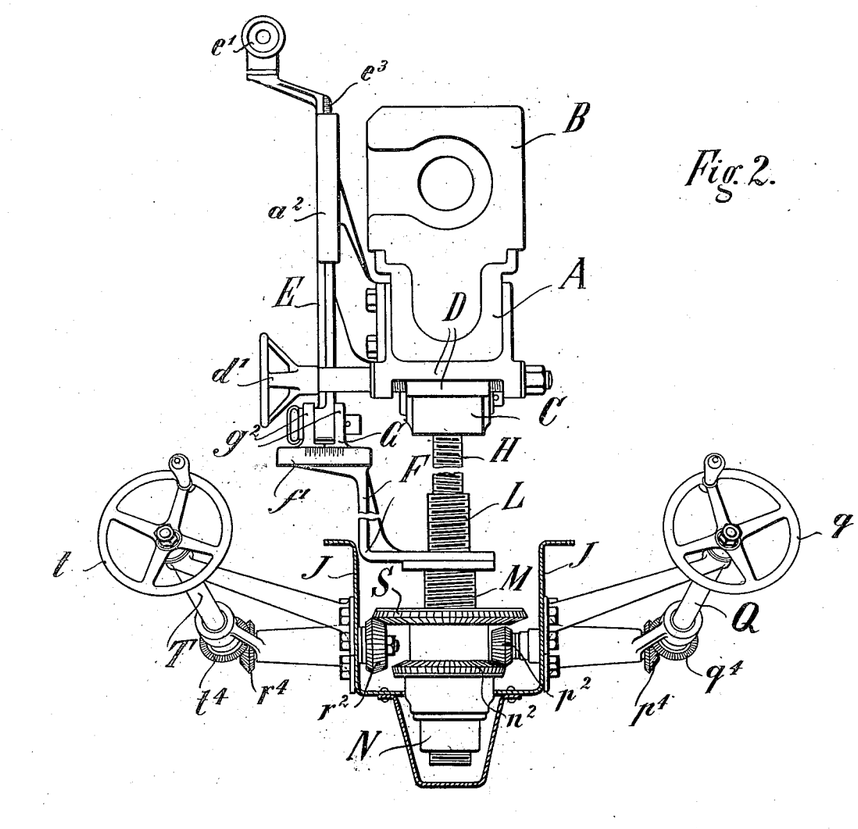
Fig. 2 is a rear elevation of Fig. 1.
Figure 3:
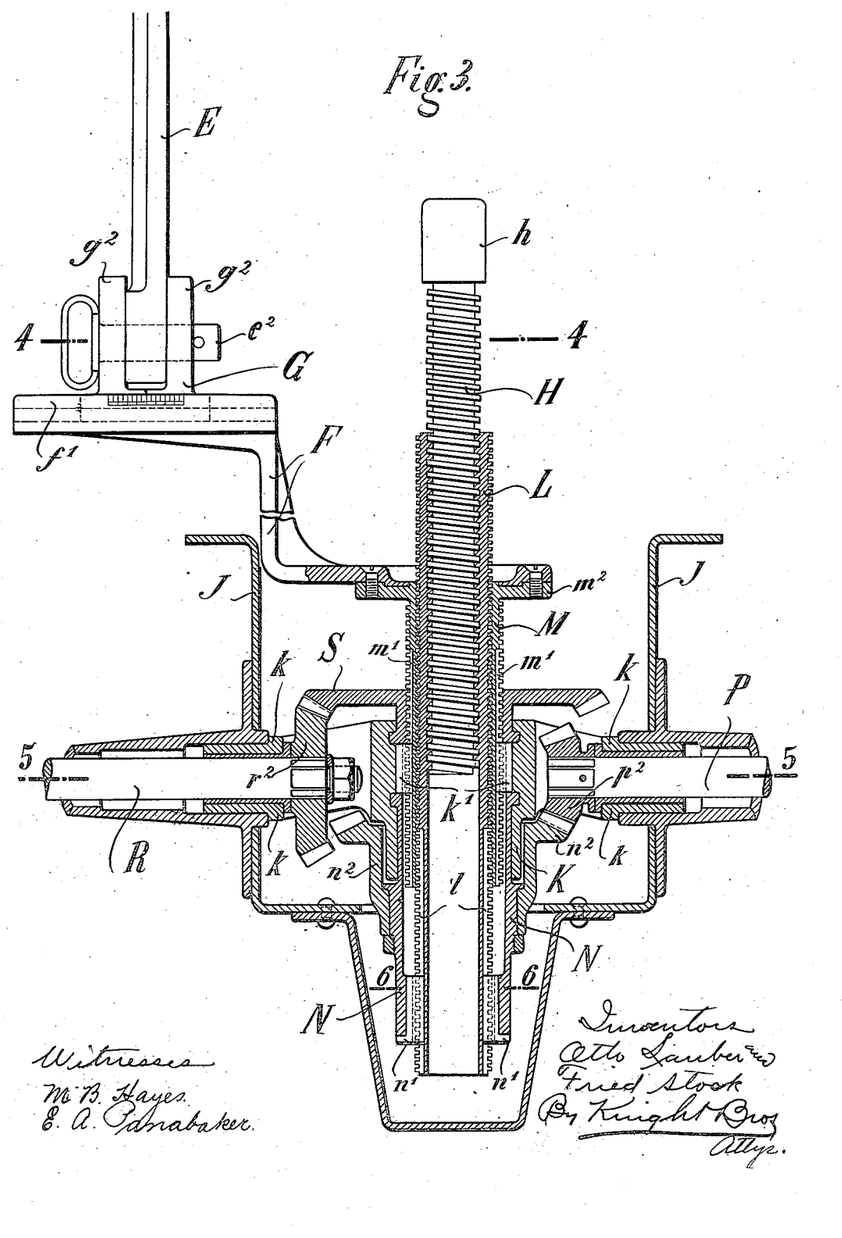
Fig. 3 is a sectional view, on an enlarged scale, taken on line 3 3, Fig. 1, and looking from the right.
Figure 4:
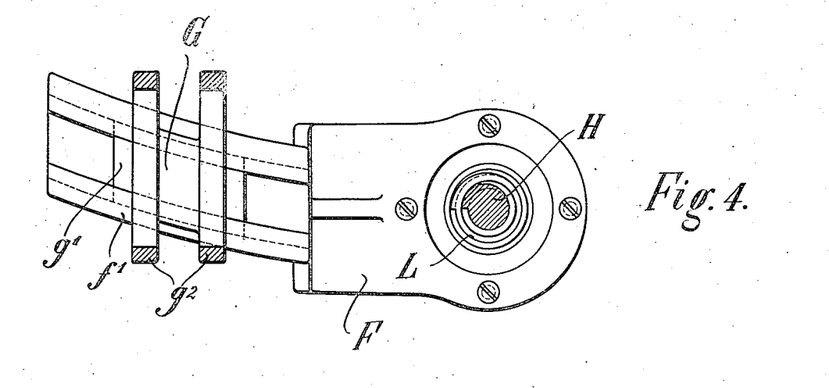
Fig. 4 is a section on line 4 4, Fig. 3, looking from above.
Figure 5:
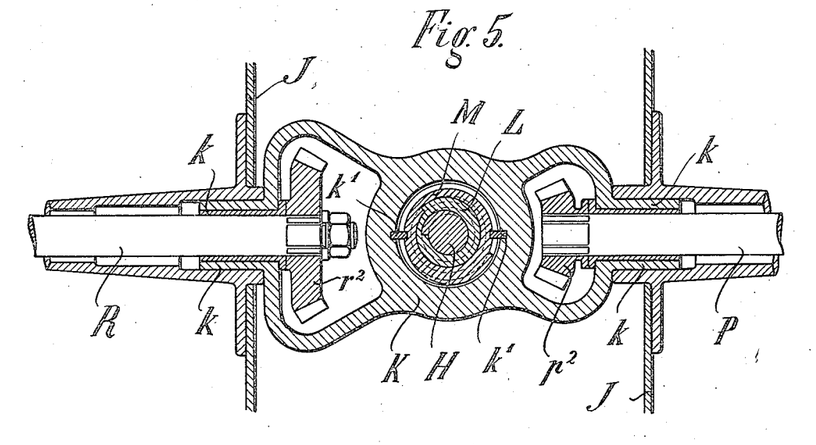
Fig. 5 is a section on line 5 5, Fig. 3, looking from above.
Figure 6:
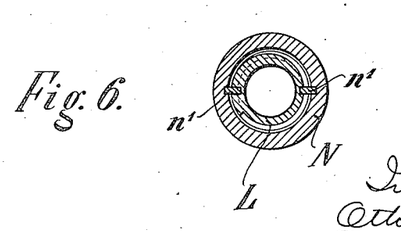
Fig. 6 is a section on line 6 6, Fig. 3, looking from above.
Figure 8:
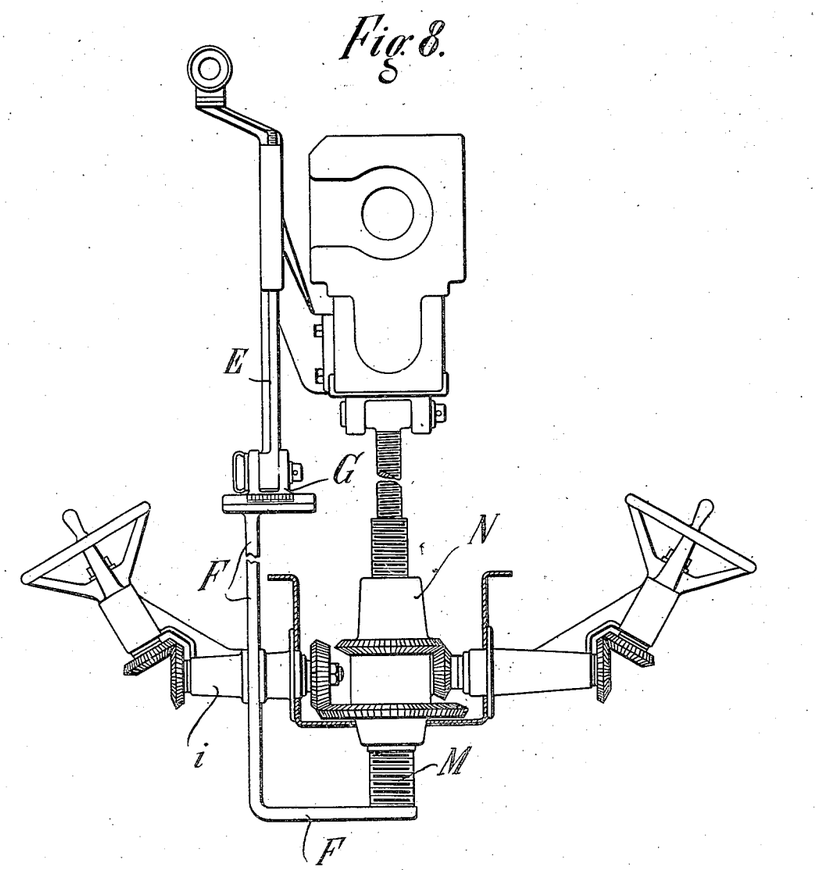
Fig. 8 is a rear elevation of the embodiment shown in Fig. 7.
Figure 9:
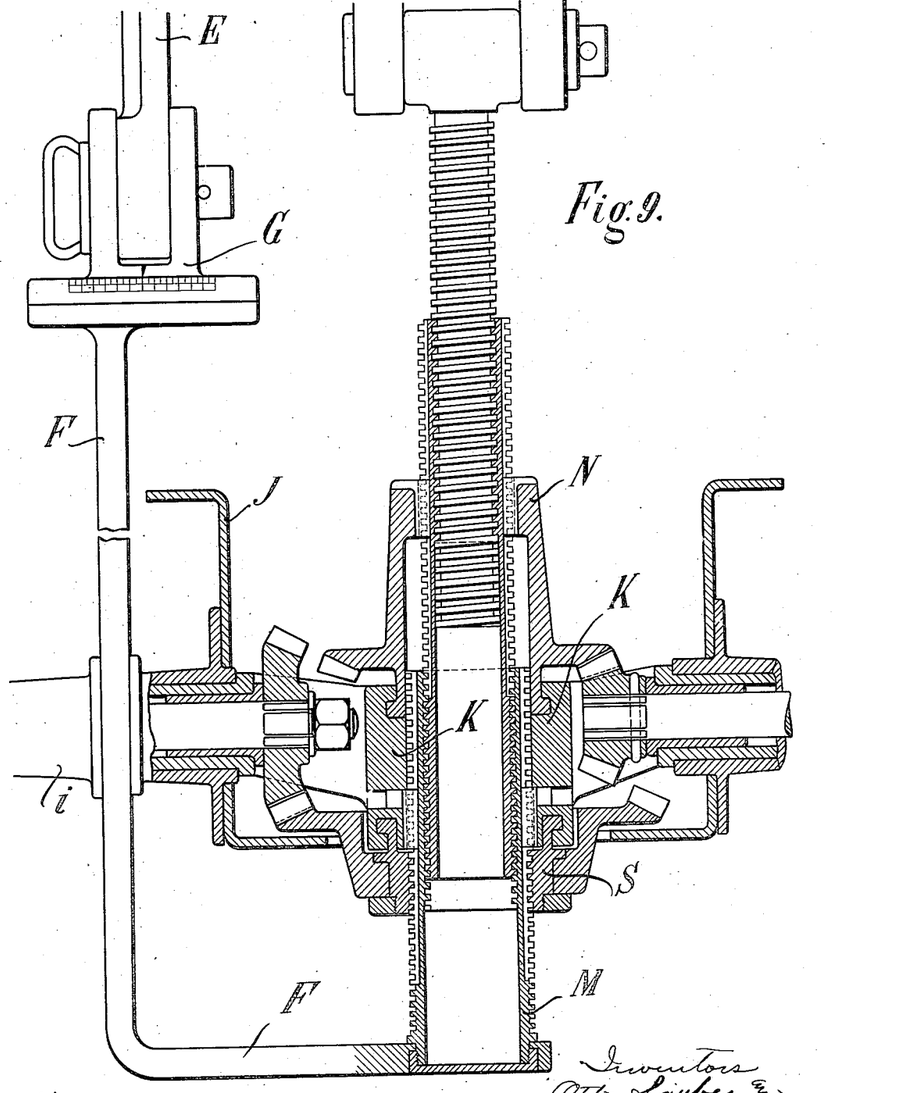
Fig. 9 is a sectional view, on an enlarged scale, taken on line 9 9, Fig. 7, and looking from the right.

The embodiment shown in Figs. 7 to 9 is in all essential features similar to that above described. Only the mounting of some of the parts relatively to the carrier K is somewhat different. The positions of the sleeve N and the nut S have been transposed, the sleeve N being arranged at the upper part of the carrier, while the nut S is arranged at the lower part of the carrier K. The result of this transposition is that the direction of the inclination of the threads of all three screws has been changed and that the arm F is secured to the lower end of the screw M. Furthermore, the arm F projects upwardly at the outside of the mount J and is provided with a slot $f^2$, through which passes the arm $i$. The mode of operation of the embodiment shown in Figs. 7 to 9 is exactly the same as that of the embodiment first described.

Figure 10:
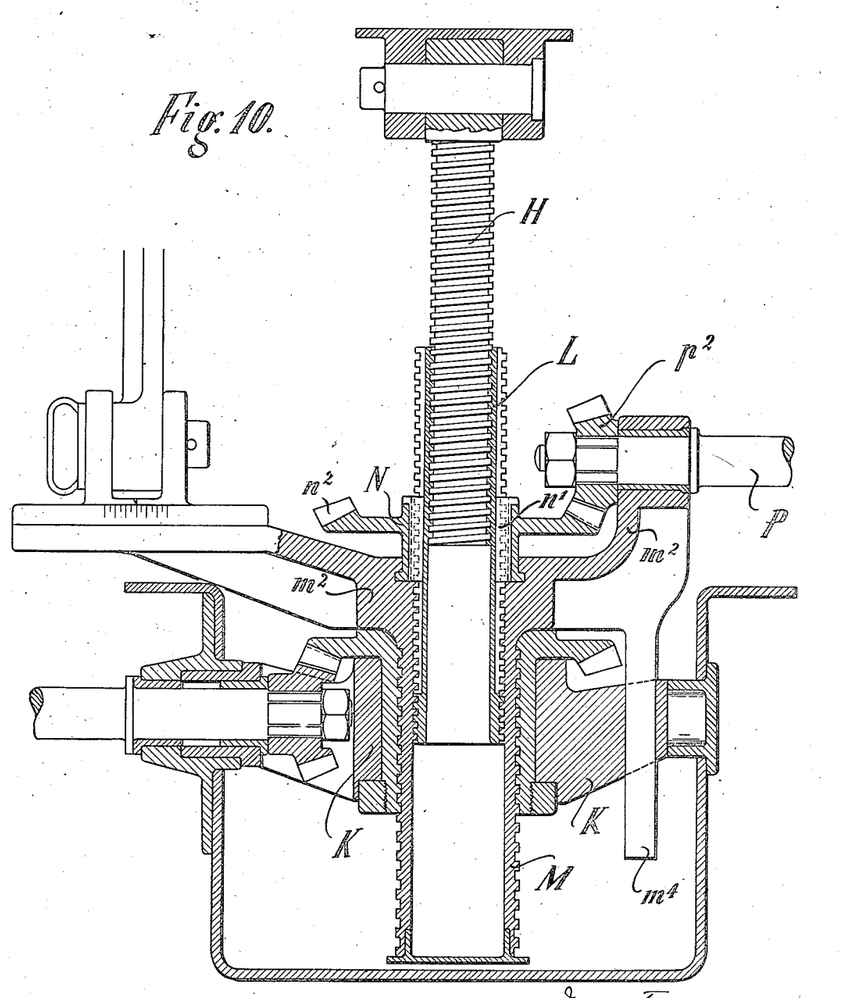
Fig. 10 is a sectional view similar to Figs. 3 and 9, but of a third embodiment of the invention.

The embodiment shown in Fig. 10 differs from that shown in Figs. 1 to 6, essentially, only in that the gear N $n'$ $n^2$ $p^2$ P of the elevating-screws H and L is journaled in the disk-shaped head $m^2$ of the screw M. Furthermore, the feathers $k'$ are replaced by a projecting rod $m'$, secured to the head $m^2$ and entering a bore in the elevating-mechanism carrier K. Otherwise the construction and mode of operation of the two embodiments are alike.

Having thus described the invention, the following is what is claimed as new:

1. An elevating mechanism for guns embodying a screw adapted to support the gun-barrel, a screw having means adapting it for connection with sight-post, means for mounting the latter screw on the gun-mount, a screw connecting both the first-named screws, means for rotating the connecting-screw to move the gun independently of the sight, and means for elevating the sight-post-connecting screw to move the gun-barrel and the sight-post together.

2. In a gun-elevating mechanism, the combination of three telescoping screws, means adapting one of the screws for supporting a gun-barrel, means adapting another of the screws for connection with the gun-sight, means for elevating this latter screw, and means for rotating the intermediate or other screw.

3. The combination of a carrier adapted for swinging movement on the mount, a pair of bevel-gears journaled in the carrier, a pair of telescoping screws one of which is rotated by, but has axial movement relative to one of said bevel-gears, and the other of which is elevated by the other bevel-gear, means adapting the latter of said screws for connection with a gun-sight post, and a third screw adapted to support a gun-barrel and adapted to telescope within the other screws.

4. In a gun, the combination with the mount, a part to be elevated pivoted on the mount and a sighting-post, of a screw having a pivotal connection with the part to be elevated, a screw having a pivotal connection with the mount and connection with the sighting-post, a screw connecting the two first-named screws, means for elevating the screw connected to the sight-post to move the gun barrel and sight together and means for rotating the connecting-screw to move the gun-barrel independently of the sight.

5. In a gun, the combination with the part to be elevated, its mount and a sight-post, of an elevating mechanism having a pivotal connection with the part to be elevated, a pivotal connection with the mount, and a loose sliding connection with the sight-post.

6. In a gun, the combination with the part to be elevated, its mount, and a sight-post, of an elevating mechanism embodying three telescoping parts, the upper of which has pivotal connection with the part to be elevated and the lower having a pivotal connection with the gun-mount and a loose sliding connection with the sight-post.

7. In a gun, the combination with the gun-barrel, and the sight-post, capable of relative vertical adjustment, of a pair of elevating mechanisms having screw members arranged coaxially to one another; one of said mechanisms being adapted to move the gun-barrel, and the other of said mechanisms adapted to move the gun-barrel and the sight-post.

8. In a gun having vertical and horizontal movement relative to the gun-mount, the combination with the gun-barrel, and the sight-post capable of relative vertical adjustment, of a pair of elevating mechanisms, one of said mechanisms being adapted to move the gun-barrel, and the other of said mechanisms being adapted to move the gun-barrel and the sight-post, means permitting swinging movement of said mechanisms relative to the sight-post, and means permitting horizontal training of the sight-post relative to said mechanisms.

9. In a gun having vertical and horizontal movement relative to the gun-mount, the combination with the gun-barrel, and the sight-post capable of relative vertical adjustment, of a pair of elevating mechanisms having screw members arranged coaxially to one another, one of said mechanisms being adapted to move the gun-barrel, and the other of said mechanisms being adapted to move the gun-barrel and the sight-post, means permitting swinging movement of said mechanisms relatively to the sight-post, and means permitting horizontal training of the sight-post relatively to said mechanism.

10. The combination with the gun-mount, the sight-post and the part to be elevated adjustable relatively to the sight-post, of a pair of elevating mechanisms embodying a plurality of coaxial screws, means rotating one of the screws and causing the elevation of the gun relatively to the sight-post and means moving another of the screws and causing the elevation of the sight-post and the gun together.

The foregoing specification signed at Essen-on-the-Ruhr this 13th day of August, 1904.

OTTO LAUBER.
FRIEDRICH STOCK.

In presence of—
HARRY L. MEFFORD,
LUDW. MANDELARTS.